US012121953B2

(12) United States Patent
Denkmeier et al.

(10) Patent No.: US 12,121,953 B2
(45) Date of Patent: Oct. 22, 2024

(54) METHOD FOR OPERATING A BENDING PRESS

(71) Applicant: TRUMPF Maschinen Austria GmbH & Co. KG., Pasching (AT)

(72) Inventors: Thomas Denkmeier, Traun (AT); David Haim, Thening (AT); Peter Simmel, Niederwaldkirchen (AT)

(73) Assignee: TRUMPF Maschinen Austria Gmbh & Co. KG, Pasching (AT)

( * ) Notice: Subject to any disclaimer, the term of this patent is extended or adjusted under 35 U.S.C. 154(b) by 0 days.

(21) Appl. No.: 17/255,058

(22) PCT Filed: Jul. 30, 2019

(86) PCT No.: PCT/AT2019/060247
§ 371 (c)(1),
(2) Date: Dec. 22, 2020

(87) PCT Pub. No.: WO2020/023988
PCT Pub. Date: Feb. 6, 2020

(65) Prior Publication Data
US 2021/0268565 A1 Sep. 2, 2021

(30) Foreign Application Priority Data
Jul. 31, 2018 (AT) .................. 50667/2018

(51) Int. Cl.
B21D 5/02 (2006.01)
B21D 55/00 (2006.01)
F16P 3/14 (2006.01)

(52) U.S. Cl.
CPC .............. B21D 5/02 (2013.01); B21D 55/00 (2013.01); F16P 3/144 (2013.01)

(58) Field of Classification Search
CPC ........ B21D 55/00; B21D 5/02; B21D 5/0209; B21D 5/0236; B21D 5/0254; B21D 7/16;
(Continued)

(56) References Cited

U.S. PATENT DOCUMENTS 6,316,763 B1    11/2001  Appleyard et al.
6,752,253 B2     6/2004  Fiessler
(Continued)

FOREIGN PATENT DOCUMENTS

CN    1362898 A    8/2002
CN    1605406 A    4/2005
(Continued)

OTHER PUBLICATIONS

International Search Report in PCT/AT2019/060245, mailed Nov. 18, 2019.
(Continued)

Primary Examiner — Debra M Sullivan
Assistant Examiner — Matthew Stephens
(74) Attorney, Agent, or Firm — Collard & Roe, P.C.

(57) ABSTRACT

The invention relates to a method for operating a bending press (10), wherein the bending press (10) comprises
a first platform (1) with a first tool mount (11) and a second platform (2) with a second tool mount (12), wherein one of the platforms (1) is movable relative to the other platform (2) for performing a working movement,
a safety device (20) for creating a light barrier (27), in particular laser light barrier, extending between the tool mounts (11, 12) transversely to the working movement of the movable platform (1), which light barrier (27), in a cross-section, forms a light field (7), wherein the safety device (20) has a first mount (21), which carries a light emitter (25) for creating the light barrier (27),
(Continued)

and a second mount (22), which carries a light receiver (26) for receiving the light of the light barrier (27), and wherein the first mount (21) is arranged on a first side of the first platform (1) and is adjustable relative to the first platform (1) by a first adjustment drive (23), such that the position of the light barrier (27) relative to the first tool mount (11) can be changed in the direction of the working movement of the movable platform (1), a controller (9) that is connected to the first adjustment drive (23), characterized in that before a bending operation or a series of bending operations, the controller (9) brings the first mount (21) into a working position by controlling the first adjustment drive (23), in which working position the tool tip (4) of a bending tool (8) held by the first tool mount (11) lies within the light field (7) formed by the light barrier (27).

19 Claims, 3 Drawing Sheets

(58) Field of Classification Search
CPC ........ B21D 11/22; B30B 15/285; F16P 3/001; F16P 3/005; F16P 3/02; F16P 3/04; F16P 3/08; F16P 3/144

See application file for complete search history.

(56) References Cited

U.S. PATENT DOCUMENTS

| | | | |
|---|---|---|---|
| 6,786,145 B2 | 9/2004 | Kilian et al. | |
| 6,903,327 B1 | 6/2005 | Appleyard | |
| 6,919,555 B2 * | 7/2005 | Fiessler | B30B 15/285 250/221 |
| 7,446,301 B2 | 11/2008 | Fischereder | |
| 7,454,935 B2 | 11/2008 | Braune et al. | |
| 7,963,137 B2 | 6/2011 | Braune et al. | |
| 8,119,964 B2 | 2/2012 | Hufnagel et al. | |
| 9,346,091 B2 | 5/2016 | Hufnagel et al. | |
| 9,421,678 B2 | 8/2016 | Fiessler | |
| 2002/0104958 A1* | 8/2002 | Fiessler | B30B 15/285 250/221 |
| 2002/0134922 A1* | 9/2002 | Appleyard | B21D 55/00 250/221 |
| 2002/0170401 A1* | 11/2002 | Fiessler | B21D 55/00 83/74 |
| 2006/0006315 A1 | 1/2006 | Appleyard | |
| 2007/0214854 A1 | 9/2007 | Braune et al. | |
| 2010/0220184 A1* | 9/2010 | Appleyard | H04N 7/18 348/86 |
| 2013/0269962 A1* | 10/2013 | Fiessler | B30B 15/161 173/1 |
| 2015/0314364 A1* | 11/2015 | Fiessler | B21D 28/00 72/1 |
| 2018/0126682 A1 | 5/2018 | Fiessler et al. | |

FOREIGN PATENT DOCUMENTS

| | | | | |
|---|---|---|---|---|
| CN | 102822589 A | | 12/2012 | |
| DE | 197 17 299 A1 | | 2/1998 | |
| DE | 101 23 562 A1 | | 11/2002 | |
| DE | 10232795 A1 | | 7/2003 | |
| DE | 103 09 399 A1 | | 9/2004 | |
| DE | 697 35 472 T2 | | 12/2006 | |
| DE | 20 2007 002 078 U1 | | 4/2007 | |
| DE | 10 2007 006 306 A1 | | 7/2008 | |
| DE | 202010017960 U1 * | | 6/2013 | ............. F16P 3/142 |
| EP | 1 259 340 B1 | | 3/2005 | |
| EP | 2 644 962 A1 | | 10/2013 | |
| EP | 3 321 557 A1 | | 5/2018 | |
| JP | H0726011 A | | 1/1995 | |
| JP | 2005-520692 A | | 7/2005 | |
| JP | 2008543586 A | | 12/2008 | |
| WO | 2005/030410 A1 | | 4/2005 | |
| WO | 2006135961 A1 | | 12/2006 | |

OTHER PUBLICATIONS

International Search Report in PCT/AT2019/060247, mailed Dec. 6, 2019.

* cited by examiner

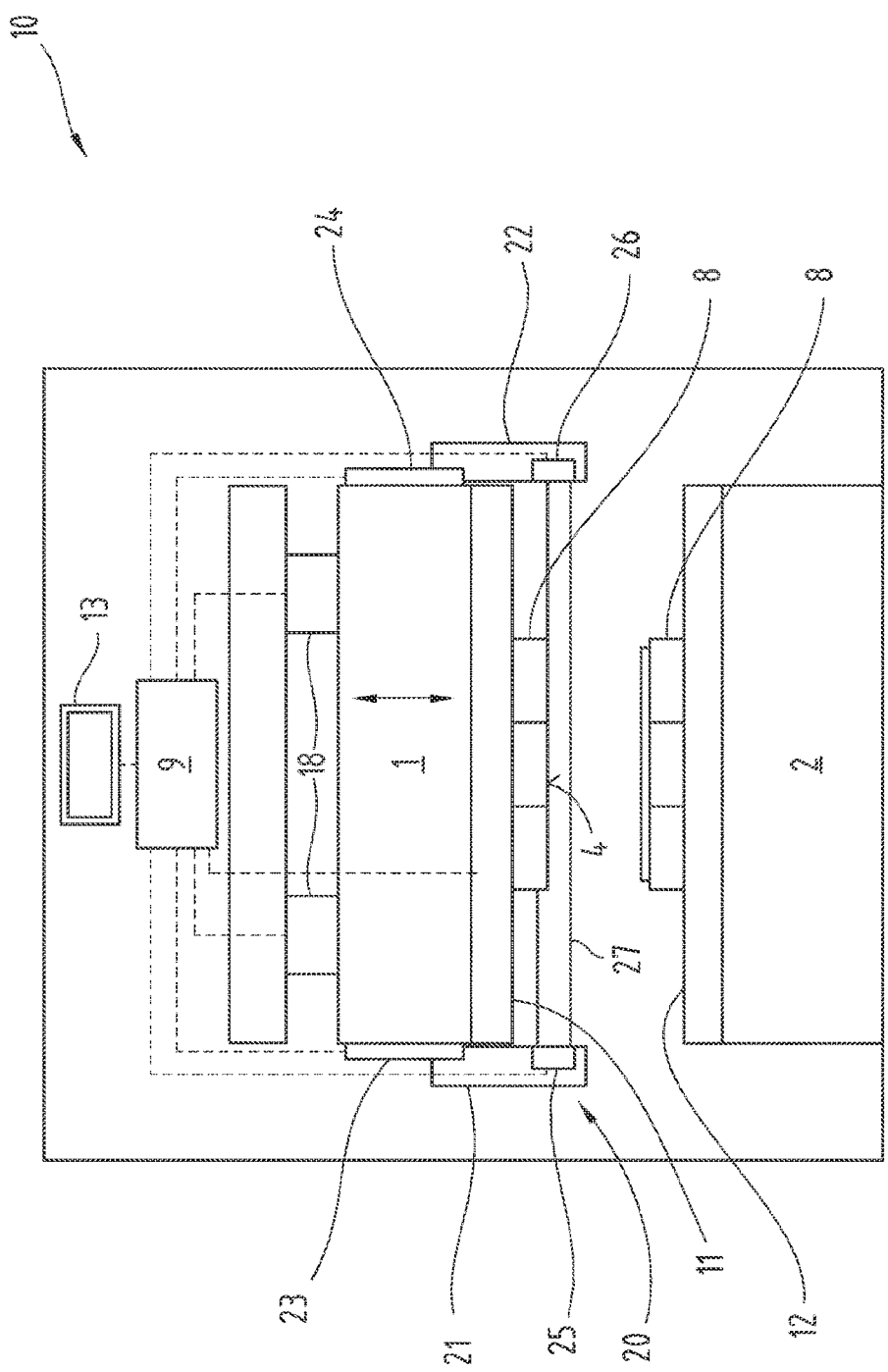

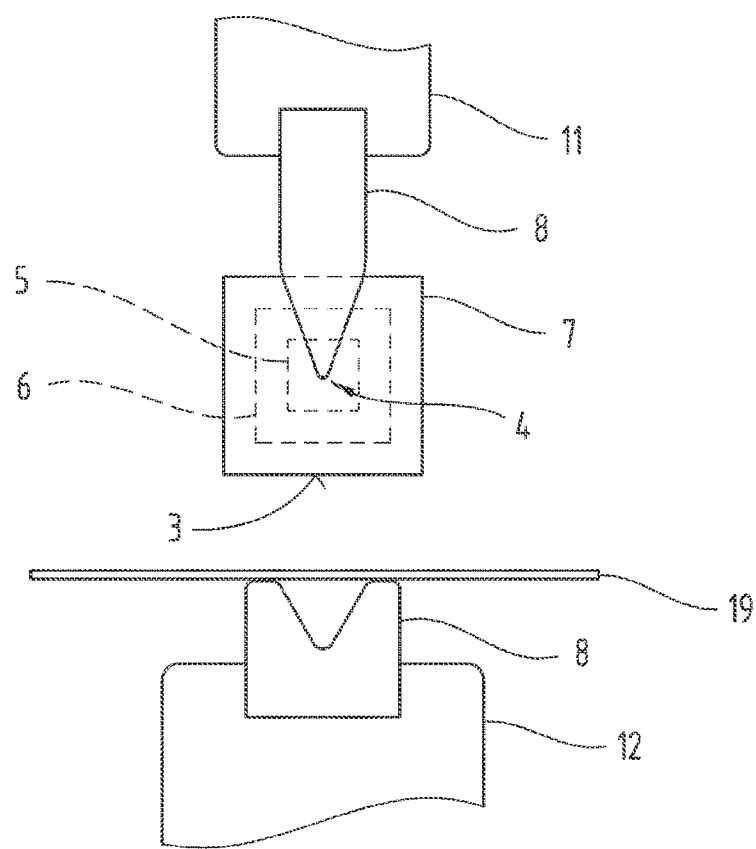
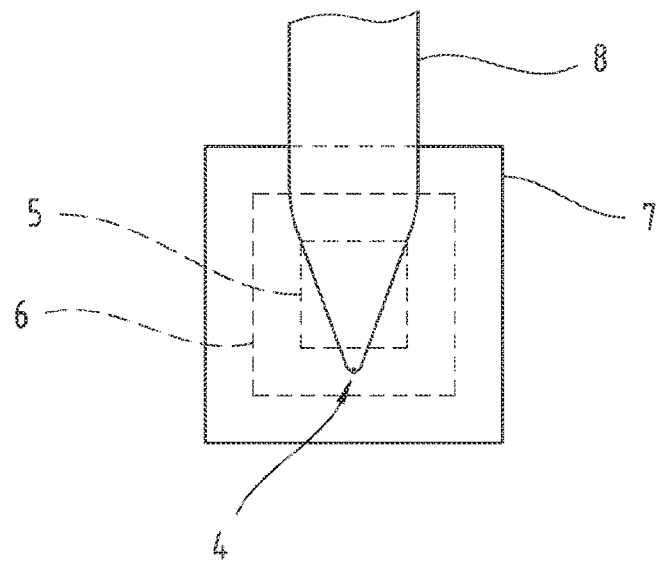

METHOD FOR OPERATING A BENDING PRESS

CROSS REFERENCE TO RELATED APPLICATIONS

This application is the National Stage of PCT/AT2019/060247 filed on Jul. 30, 2019, which claims priority under 35 U.S.C. § 119 of Austrian Application No. A 50667/2018 filed on Jul. 31, 2018, the disclosure of which is incorporated by reference. The international application under PCT article 21 (2) was not published in English.

The invention relates to a method for operating a bending press, in particular a press brake, wherein the bending press comprises

- a first platform with a first tool mount and a second platform with a second tool mount, wherein one of the platforms is movable relative to the other platform for performing a working movement,
- a safety device for creating a light barrier, in particular laser light barrier, extending between the tool mounts transversely to the working movement of the movable platform, which light barrier, in a cross-section, forms a light field, wherein the safety device has a first mount, which carries a light emitter for creating the light barrier, and a second mount, which carries a light receiver for receiving the light of the light barrier, and wherein the first mount is arranged on a first side of the first platform and is adjustable relative to the first platform by a first adjustment drive, such that the position of the light barrier relative to the first tool mount can be changed in the direction of the working movement of the movable platform,
- a controller that is connected to the first adjustment drive.

The invention also relates to a bending press for carrying out the method.

In order to meet the prescribed safety requirements, bending presses are increasingly equipped with safety devices which are meant to prevent undesired collisions of a bending tool with an object or the jamming of a finger or a hand of an operator between bending tools or between a bending tool and the workpiece to be bent. Safety devices in the form of light barriers have mounts for a light emitter and/or a light receiver on either side of the press beam.

In this regard, the mounts are adjustable, whereby an automatic and flexible positioning of the light barrier is made possible, in each case dependent on the bending tool used. In this context, it is known from the prior art that an operator enters the tool height via a user interface of the bending press, and that the target position for the light barrier is automatically calculated from the tool height.

The object of the present invention was to overcome the disadvantages of the prior art and to provide a method for operating a bending press, by means of which the setting of the light barrier can be further improved. In particular, it should be ensured that the light barrier—independently of the and/or with any bending tool used—occupies the optimal position and thus can reliably perform the safety function. In particular, it is also to be precluded that an inaccurate positioning (e.g. by entering wrong tool data) takes place and leads to dangerous positions.

This object is achieved by a method of the initially mentioned type in that, before a bending operation or a series of bending operations, the controller brings the first mount into a working position by controlling the first adjustment drive, in which working position the tool tip of a bending tool held by the first tool mount lies within the light field formed by the light barrier, preferably in a predefined first region of the light field.

By this measure, the tool tip, which is decisive for the position of the light barrier, can be used as a reference point. The adjustment of the first mount and thus the setting of the light receiver (and thus the positioning of the light barrier) is related in each case to the tool tip of a bending tool set up for the subsequent bending operation. This not only allows a precise and reliable positioning of the light barrier, but also the prevention from the start of misadjustments. The tool tip can be recognized as such by the light receiver and/or the controller and be distinguished from other shadows (fingers, foreign bodies etc.).

It is preferred if the first mount with the light emitter is adjusted such that the tool tip comes to lie in a predefined first region within the light field. This first region is smaller than the light field and corresponds to an optimal region. The first region and/or its coordinates (within the light field and/or within the sensor surface of the light receiver) is stored in the light receiver and/or in the controller and is data-technically associated with the position of the captured tool tip. This way, it can be determined whether the tool tip actually is in the predefined first region.

A bending operation is started by the controller only once the adjusting operation of the light barrier is completed and its position meets the criteria according to the invention.

The term "tool tip" is to be understood broadly and not only comprises a punctiform point in the present application but also rounded tool ends and/or—in particular in the case of press brakes—oblong edges of a bending tool, which edge in a cross-section looks like a point or a rounded point and/or a tapering end. "Tool tip" may also mean the end of a stamp-type bending tool acting on the workpiece, and/or generally speaking describe the first region of the bending tool to come into contact with the workpiece during the bending operation, or—in other words—the end of the forming section of the bending tool facing the workpiece.

The light field corresponds with the cross-section of the light barrier, A preferred embodiment is characterized in that the light barrier is formed by at least one light beam widened to a light field, and/or comprises multiple light beams, preferably extending in a parallel manner. In the first case, a lens can be used for widening an individual light beam. Preferably, a homogeneous light field is (transverse to the dispersion direction of the light barrier). The term "light barrier" is therefore understood to be any type of light beam(s) or light field(s)—of one or multiple individual light beams/fields. The principle that a partial or complete disruption of the light barrier (by foreign objects and/or a hand or a finger of an operator etc.) makes it possible for the light receiver to detect a darkening and/or a shadow is used here. Equally, the light field makes the detection and/or recognition of the shadow, which is cast onto the light receiver by the tool tip (protruding into the light field), possible.

The light barrier extends substantially parallel to the first tool mount, which is preferably designed in the form of a guide rail, and/or—in the case of press brakes—substantially parallel to the bending line.

A preferred embodiment is characterized in that the light receiver is an image receiver, preferably a camera. In particular, a pixel by pixel evaluation of the captured image can significantly facilitate the shadow recognition and shadow association. Preferably, the light receiver may be a flat sensor, whose light-sensitive surface corresponds with e.g. at least the cross-section of the light barrier, i.e. the surface of the light field.

Although it is preferred to arrange the mount of the light receiver—analogously to that of the light emitter—on the first platform and to design it so as to be adjustable relative to the platform, an alternative embodiment provides that the light receiver may also be fastened to the first platform in a stationary or unadjustable manner and may be configured, e.g. by means of a corresponding size (flat image sensor), to capture the light barrier in its different positions relative to the first platform.

A platform can be understood to be any structure which is suitable for carrying or integrally forming a tool mount and for absorbing forcing which are transferred during the bending operation. The first platform and/or the second platform can be particularly be formed as press beams and/or have a longitudinal extension running transversely to the working movement and/or pressing direction.

In this regard, the safety device is configured such that the position of the light barrier, which is determined by the position of the light emitter, can be set relative to the first tool mount and/or the tool held therein. A (complete or partial) interruption of the light barrier causes a shadow that is detected by means of the light receiver. The controller connected to the light receiver stops or slows the working movement of the bending press depending on a detected shadow.

Setting the light barrier into the working position is carried out by moving the mount(s) transversely to the longitudinal extension of the tool mount, preferably parallel to the direction of the working movement of the movable platform, wherein the direction of the working movement of the movable platform is preferably vertical.

The adjustment drive(s) can be configured in particular as a linear drive, e.g. a toothed rack comprising a pinion.

A preferred embodiment is characterized in that the controller brings the first mount into the working position depending on the shadow of the tool tip detected by the light receiver. By this measure, the light barrier can always be oriented and/or positioned with respect to the tool currently in use. This is advantageous particularly for the fine adjustment. In this regard, the setting takes place independently of influences such as temperature expansions of the tool, tool wear or tool tolerances, which always allows for a positioning of the light barrier that ensures an optimal, high degree of safety.

A preferred embodiment is characterized in that, in the working position of the first mount, the distance between the tool tip and the edge of the light field opposite the tool tip is at least a third, preferably at least half, of the expansion of the light field in the direction, in which the working movement of the movable platform takes place. In the region not shadowed by the tool tip, the light receiver and/or the controller can now recognize obstacles (fingers etc.) and as a consequence, the working movement and/or the bending operation can be stopped.

The surface of the light field is preferably at least 10 cm², particularly preferably at least 20 cm². As mentioned before, the light field can be continuously illuminated, e.g. Be formed by a widened beam or by an array of discrete light beams.

A preferred embodiment is characterized in that the position of the tool tip within the light receiver or the position of the light barrier (relative to the first tool mount or to a tool held by it) is determined based on the shadow of the tool tip detected by the light receiver. The determination of the position not only makes it possible to reliably recognize whether the tool tip is within a predefined target region or not, but also makes it possible to readjust and/or fine adjust the light barrier by adjusting the light emitter.

A preferred embodiment is characterized in that the first mount is adjusted, depending on the determined position of the tool tip within the light field or the determined position of the light barrier, until the tool tip comes to lie in a target position or a target region within the light field, preferably in a predefined first region.

A preferred embodiment is characterized in that the first mount is adjusted depending on the determined position of the tool tip within the light field or the determined position of the light barrier if the tool tip is outside the predefined first region and inside a predefined second region within the light field, wherein the predefined first region is inside the predefined second region, and that the adjustment of the first mount is carried until the tool tip comes to lie in the predefined first region. This criterion opens up the possibility to carry out an adjusting operation only if the tool tip is in a predefined second region. After setting up the tool, the mount is adjusted according to the dimensions of the tool. Ideally, the tool tip would already be in the target position. However, as this process is only a rough approaching in most cases, a fine adjustment (due to temperature expansions, tool wear and/or tool tolerances) according to the invention has to be carried out. However, if the tool tip is outside the larger, second region from the start, it must be assumed that a wrong tool has been inserted or some other fault is present. This measure, too, can prevent a bending operation from being carried out with an incorrectly positioned light barrier and/or an incorrectly set up tool, as e.g. the embodiment below shows.

Such an embodiment is characterized in that a piece of information and/or a warning is issued at a user interface of the bending press and/or the adjusting operation is interrupted if no shadow of the tool tip is detected or if the tool tip is outside a predefined second region within the light field, wherein the predefined first region is inside the predefined second region.

A preferred embodiment is characterized in that the second mount is arranged on a second side of the platform opposite the first side and is adjustable relative to the first platform by means of a second adjustment drive, wherein the controller is connected to the second adjustment drive. The second mount can thus be moved along with the first mount, so that the light of the light barrier always hits the light receiver. The surface of the light receiver is therefore about the same size as the light field.

A preferred embodiment is characterized in that the second mount with the light receiver is adjusted to the same extent as the first mount with the light emitter.

A preferred embodiment is characterized in that the first adjustment drive can be actuated independently of the second adjustment drive. Thus, fine adjustments between light emitter and light receiver can be performed.

A preferred embodiment is characterized in that the method comprises an adjustment operation, in which the light emitter and the light receiver are adjusted relative to one another by means of actuating the first adjustment drive and/or the second adjustment drive. In order to make an optimal (in particular accurate to the millimeter) positioning of the light barrier possible, light emitter and light receiver must be optimally attuned to one another with respect to their relative position. Deviations from such an optimal orientation can be easily compensated by this embodiment.

A preferred embodiment is characterized in that the adjustment operation is carried out depending on the shadow of the tool tip detected by the light receiver, in particular depending on the position of the tool tip within the light field. Here, the tool tip is selected as a reference point. In addition, a further reference, which is defined by the light field, can be used, as is described in the embodiment below.

Such an embodiment is characterized in that the light field, preferably in at least one of its edge regions, has a pattern variable in the direction of the adjustment movement of the first mount, and that the adjustment operation is carried out depending on the relative position of the shadow of the tool tip detected by the light receiver relative to the pattern detected by the light receiver. Due to these two references (tool tip and pattern) it can be easily determined whether the light emitter or the light receiver has to be readjusted and also in which direction it has to be readjusted.

A preferred embodiment is characterized in that the first tool mount is an upper tool mount and the second tool mount is a lower tool mount, and/or that the first platform is movable relative to the second platform. It has been shown that an arrangement of the safety device and/or the mount(s) on the upper, movable platform is more space-saving, in particular when bending operations are carried out in the end region of the guide rail.

In a further embodiment, the mounts for the light emitter and light receiver can be displaced into a parking position, in which the front sides of the oblong tool mounts are unblocked (while the front sides are covered in the working position of the mounts). Moving into the parking position makes an easy change of the bending tools via the front side openings of the guide rail possible.

The object is also achieved with a bending press for bending a workpiece, in particular a press brake, comprising
a first platform with a first tool mount and a second platform with a second tool mount, wherein one of the platforms is movable relative to the other platform for performing a working movement,
a safety device for creating a light barrier, in particular laser light barrier, extending between the tool mounts transversely to the working movement of the movable platform, which light barrier, in a cross-section, forms a light field, wherein the safety device has a first mount, which carries a light emitter for creating the light barrier, and a second mount, which carries a light receiver for receiving the light of the light barrier, and wherein the first mount is arranged on a first side of the first platform and is adjustable relative to the first platform by a first adjustment drive, such that the position of the light barrier relative to the first tool mount can be changed in the direction of the working movement of the movable platform,
a controller that is connected to the first adjustment, characterized in that the bending press is designed for carrying out a method according to the invention, wherein the controller is configured to control the method according to the invention, in particular by evaluating and/or processing the data recorded or evaluated by the light receiver and/or by adjusting the first adjustment drive and/or the second adjustment drive.

For the purpose of better understanding of the invention, it will be elucidated in more detail by means of the figures below.

These show in a respectively very simplified schematic representation:

FIG. 1 a bending press according to the invention

FIG. 2 a cutout from a cross-section of the bending press with light field with an optimally set light barrier FIG. 3 the light field with bending tool with not yet optimally set light barrier FIG. 4 the light field with bending tool with an incorrect or incorrectly declared bending tool FIG. 5 a preferred embodiment with a light field, which has a pattern in its lateral edge regions.

First of all, it is to be noted that in the different embodiments described, equal parts are provided with equal reference numbers and/or equal component designations, where the disclosures contained in the entire description may be analogously transferred to equal parts with equal reference numbers and/or equal component designations. Moreover, the specifications of location, such as at the top, at the bottom, at the side, chosen in the description refer to the directly described and depicted figure and in case of a change of position, these specifications of location are to be analogously transferred to the new position.

DESCRIPTION OF FIGURES

The exemplary embodiments show possible embodiment variants, and it should be noted in this respect that the invention is not restricted to these particular illustrated embodiment variants of it, but that rather also various combinations of the individual embodiment variants are possible and that this possibility of variation owing to the teaching for technical action provided by the present invention lies within the ability of the person skilled in the art in this technical field.

The scope of protection is determined by the claims. However, the description and the drawings are to be adduced for construing the claims. Individual features or feature combinations from the different exemplary embodiments shown and described may represent independent inventive solutions. The object underlying the independent inventive solutions may be gathered from the description.

Figure 4:
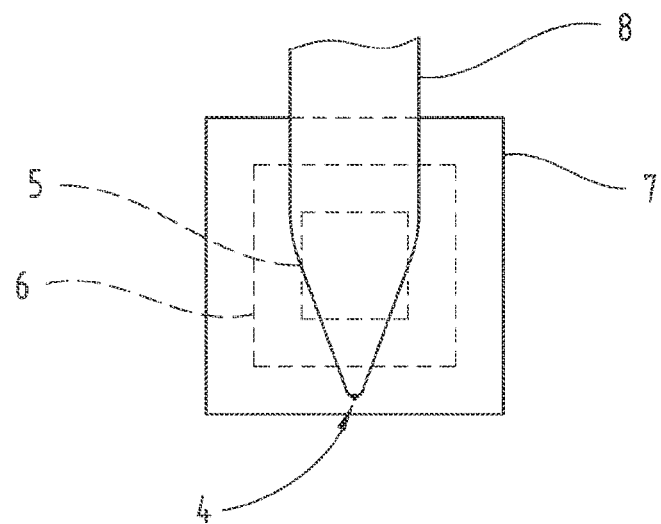

All indications regarding ranges of values in the present description are to be understood such that these also comprise random and all partial ranges from it, for example, the indication 1 to 10 is to be understood such that it comprises all partial ranges based on the lower limit 1 and the upper limit 10, i.e. all partial ranges start with a lower limit of 1 or larger and end with an upper limit of 10 or less, for example 1 through 1.7, or 3.2 through 8.1, or 5.5 through 10.

Finally, as a matter of form, it should be noted that for ease of understanding of the structure, elements are partially not depicted to scale and/or are enlarged and/or are reduced in size.

FIG. 1 shows a bending press 10 for bending a workpiece 19, here in the form of a press brake. A first (upper) platform 1 with a first tool mount 11 is movable relative to a second (lower) platform 2 with a second tool mount 12 for performing a working movement (see double arrow). The working movement is effected by the controller 9, which is connected to the press drive 18 and controls the same.

In the embodiment shown, the first tool mount 11 is an upper tool mount and the second tool mount 12 is a lower tool mount. The first platform 1 is movable relative to the second, stationary platform 2.

The bending press 10 comprises a safety device 20 for creating a light barrier 27, in particular laser light barrier, which in a cross-section forms a light field 7, extending between the tool mounts 11, 12 transversely to the working movement of the movable platform 1. The safety device 20 has a first mount 21, which carries a light emitter 25 for creating the light barrier 27, and a second mount 22, which carries the light receiver 26 for receiving the light of the light barrier 27. The first mount 21 is arranged on a first side of the first platform 1 and is adjustable relative to the first platform 1 by a first adjustment drive 23, such that the position of the light barrier 27 relative to the first tool mount 11 is changeable in the direction of the working movement of the movable platform 1 (see double arrow in FIG. 1).

The first mount 21 is arranged on a first side of the first platform 1 and adjustable relative to the first platform 1 by means of a first adjustment drive 23. The second mount 22 is arranged on a second side of the first platform 1 opposite the first side, and adjustable relative to the first platform 1 by means of a second adjustment drive 24.

The controller 9 is connected to the first adjustment drive 23 and the second adjustment drive 24. Light emitter 25 and light receiver 26 are also connected to the controller 9.

In this regard, the safety device 20 is configured such that the position of the light barrier 27, which is determined by the position of the light emitter 25 at one of the mounts, can be set relative to the first tool mount 11 and/or the tool 8 held therein. A (complete or partial) interruption of the light barrier 27 by an obstacle (e.g. a finger of an operator) occurring in the work path causes a shadow that is detected by means of the light receiver 26. The controller 9 connected to the light receiver 26 stops or slows the working movement of the bending press 10 (controlling of the press drive 18) depending on a detected shadow.

Preferably, the first tool mount 11 and/or the second tool mount 12 are designed in the form of a guide rail, which may have a front side opening at least at one of its ends for changing a bending tool 8.

The method according to the invention is now characterized in that, before a bending operation or a series of bending operations, the controller 9 brings the first mount 21 into a working position by controlling the first adjustment drive 23, in which working position the tool tip 4 of a bending tool 8 held by the first tool mount 11 lies within the light field 7 formed by the light barrier 27, preferably in a predefined first region 5 of the light field 7. The result of such a setting can be seen in FIG. 2.

Preferably, the setting is carried out such that the controller 9 brings the first mount 21 into the working position depending on the shadow of the tool tip 4 detected by the light receiver 26.

If, for instance, the point and/or its shadow is outside the target region, and thus outside the predefined first region, as it is the case in FIG. 3, the first mount with the light emitter is adjusted accordingly by actuation of the adjustment drive 23, until the light emitter occupies the position from FIG. 2.

It is preferred if, in the working position of the first mount 21, the distance between the tool tip 4 and the edge 3 of the light field 7 opposite the tool tip 4 is at least a third, preferably at least half, of the expansion of the light field 7 in the direction, in which the working movement of the movable platform 1 takes place (see FIG. 2).

Now, the position of the tool tip 4 within the light field 7 or the position of the light barrier 27 can be determined based on the shadow of the tool tip 4 detected by the light receiver 26.

Depending on the determined position of the tool tip 4 within the light field 7 or the determined position of the light barrier 27, the first mount 21 is now adjusted until the tool tip 4 comes to lie in a target position or a target region within the light field 7, preferably in the predefined first region 5.

In connection with the relative position between tool tip 4 and light field 7 shown in FIG. 3, the first mount 21 can now be adjusted depending on the determined position of the tool tip 4 within the light field 7 or the determined position of the light barrier 27, if the tool tip 4 is outside the predefined first region 5 but still inside a predefined second region 6 within the light field 7. The predefined first region 5 is inside the predefined second region 6. The adjustment of the first mount (21) is carried out until the tool tip 4 comes to lie in the predefined first region 5 (see FIG. 2).

If, however, no shadow of the tool tip 4 is detected or if the tool tip 4 is outside a predefined second region 6 (see FIG. 4), a piece of information and/or a warning may be issued at a user interface 13 and/or the adjusting operation may be interrupted.

In the embodiment shown in FIG. 1, the second mount with the light receiver is designed analogously to the first mount, and the second mount 22 with the light receiver 26 is adjusted in each case to the same extent as the first mount 21 with the light emitter 25. As mentioned before, the light receiver could, however, also be designed differently, in particular stationary, e.g. if its capturing region and/or its light-sensitive surface covers a larger region (meaning it covers all possible positions of the light receiver in the direction of the working movement).

Still, the first adjustment drive 23 may be adjustable independently of the second adjustment drive 24, whereby a fine adjustment is made possible. In the case of such a fine adjustment, the light emitter 25 and the light receiver 26 can be adjusted relative to one another by means of actuating the first adjustment drive 23 and/or the second adjustment drive 24.

The adjustment operation can be carried out depending on the shadow of the tool tip 4 detected by the light receiver 26, in particular depending on the position of the tool tip 4 within the light field 7. Thus, the tool tip is used here as (a) reference point.

Figure 5:
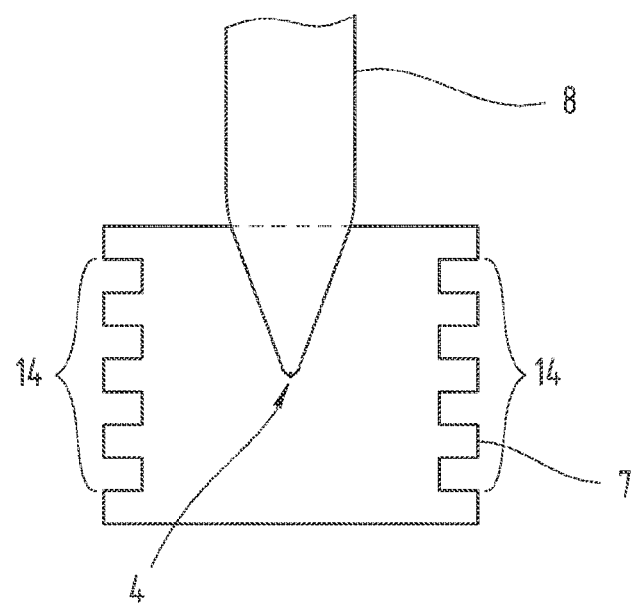

However, it is particularly preferred if the light field 7, preferably in at least one of its edge regions, has a pattern 14 variable in the direction of the adjustment movement of the first mount 21 (see FIG. 5). The adjustment operation can be carried out depending on the relative position of the shadow of the tool tip 4 detected by the light receiver 26 relative to the pattern 14 detected by the light receiver 26. Due to these two references (tool tip and pattern) it can be easily determined whether the light emitter or the light receiver has to be readjusted and also in which direction it has to be readjusted.

In each case, the bending press 10 is designed for carrying out a method according to the invention, and the controller 9 is configured to control the method according to the invention, in particular by evaluating and/or processing the data recorded or evaluated by the light receiver 26 and/or by adjusting the first adjustment drive 23 and/or the second adjustment drive 24.

LIST OF REFERENCE NUMBERS 1 first platform
2 second platform
3 edge of the light field 7
4 tool tip
5 predetermined first region
6 predetermined second region
7 light field
8 bending tool
9 controller
10 bending press
11 first tool mount
12 second tool mount
13 user interface
14 pattern
18 press drive 19 workpiece
20 safety device
21 first mount
22 second mount
23 first adjustment drive
24 second adjustment drive
25 light emitter
26 light receiver
27 light barrier

The invention claimed is:

1. A method for operating a bending press wherein the bending press comprises:
   a first platform with a first tool mount and a second platform with a second tool mount, wherein one of the first platform and the second platform is movable relative to another of the first platform and the second platform for performing a working movement,
   a safety device for creating a light barrier extending between the first tool mount and the second tool mount transversely to the working movement of the one of the first platform and the second platform, which light barrier, in a cross-section, forms a light field, wherein the safety device has a first mount, which carries a light emitter for creating the light barrier, and a second mount, which carries a light receiver for receiving the light of the light barrier, and wherein the first mount is arranged on a first side of the first platform and is adjustable relative to the first platform by a first adjustment drive, such that a position of the light barrier relative to the first tool mount can be changed in a direction of the working movement of the one of the first platform and the second platform, and
   a controller that is connected to the first adjustment drive, wherein the method comprises the steps of:
   (a) controlling the first adjustment drive, via the controller, to bring the first mount into a working position;
      wherein in the working position, a tool tip of a bending tool held by the first tool mount lies within the light field formed by the light barrier;
      wherein the controller brings the first mount into the working position depending on a shadow of the tool tip being detected by the light receiver;
      wherein a position of the tool tip within the light field or the position of the light barrier is determined based on the shadow of the tool tip being detected by the light receiver;
      wherein the first mount is adjusted depending on a determined position of the tool tip within the light field or a determined position of the light barrier, until the tool tip comes to lie in a target position or a target region within the light field;
   (b) when the tool tip is outside a predefined first region comprising a target position or a target region within the light field and inside a predefined second region within the light field, wherein the predefined first region is inside the predefined second region, adjusting a position of the first mount depending on a determined position of the tool tip within the light field or a determined position of the light barrier;
   (c) adjusting the position of the first mount until the tool tip comes to lie in the predefined first region; and
   (d) subsequently performing a bending operation or a series of bending operations with the tool tip lying in the target position or the target region within the light field.

2. The method according to claim 1, wherein, in the working position of the first mount, a distance between the tool tip and an edge of the light field opposite the tool tip is at least a third of an expansion of the light field in a direction in which the working movement of the one of the first platform and the second platform takes place.

3. The method according to claim 2, wherein, in the working position of the first mount, the distance between the tool tip and the edge of the light filed opposite the tool tip is at least half of the expansion of the light field in the direction in which the working movement of the one of the first platform and the second platform takes place.

4. The method according to claim 1, further comprising at least one of the steps of outputting an information and/or a warning at a user interface of the bending press and interrupting the step of adjusting the position of the first mount if no shadow of the tool tip is detected or if the tool tip is outside the predefined second region within the light field.

5. The method according to claim 1, wherein the second mount is arranged on a second side of the platform opposite the first side and is adjustable relative to the first platform via a second adjustment drive, wherein the controller is connected to the second adjustment drive.

6. The method according to claim 5, wherein the second mount with the light receiver is adjusted to the same extent as the first mount with the light emitter.

7. The method according to claim 5, wherein the first adjustment drive is actuatable independently of the second adjustment drive.

8. The method according to claim 5, wherein the method comprises an adjustment operation, in which the light emitter and the light receiver are adjusted relative to one another by actuating at least one of the first adjustment drive and the second adjustment drive.

9. The method according to claim 8, wherein the adjustment operation is carried out depending on the shadow of the tool tip being detected by the light receiver.

10. The method according to claim 9, wherein the adjustment operation is carried out depending on a position of the tool tip within the light field.

11. The method according to claim 8, wherein the light field has a pattern variable in the direction of an adjustment movement of the first mount, and wherein the adjustment operation is carried out depending on the relative position of the shadow of the tool tip detected by the light receiver relative to the pattern detected by the light receiver.

12. The method according to claim 11, wherein the pattern variable in the direction of the adjustment movement of the first mount is disposed in at least one edge region of the light field.

13. The method according to claim 1, wherein the first tool mount is an upper tool mount and the second tool mount is a lower tool mount, and/or wherein the first platform is movable relative to the second platform.

14. The method according to claim 1, wherein the bending press comprises a press brake.

15. The method according to claim 1, wherein the light barrier comprises a laser light barrier.

16. The method according to claim 1, wherein in the working position, the tool tip of the bending tool held by the first tool mount lies within a predefined first region of the light filed.

17. The method according to claim 1, wherein first mount is adjusted depending on the determined position of the tool tip within the light field or the determined position of the light barrier, until the tool tip comes to lie in a target position or a target region within the light field, the target position of target region comprising a predefined first region.

18. A bending press for bending a workpiece, the bending press comprising:
- a first platform with a first tool mount and a second platform with a second tool mount, wherein one of the first platform and the second platform is movable relative to another of the first platform and the second platform for performing a working movement,
- a safety device for creating a light barrier extending between the first tool mount and the second tool mount transversely to the working movement of the one of the first platform and the second platform, which light barrier, in a cross-section, forms a light field, wherein the safety device has a first mount, which carries a light emitter for creating the light barrier, and a second mount, which carries a light receiver for receiving the light of the light barrier, and wherein the first mount is arranged on a first side of the first platform and is adjustable relative to the first platform by a first adjustment drive, such that a position of the light barrier relative to the first tool mount can be changed in the direction of the working movement of the one of the first platform and the second platform, and
- a controller that is connected to the first adjustment drive,
  - wherein the controller is configured to evaluate and/or process data recorded or evaluated by the light receiver and/or to adjust at least one of the first adjustment drive and a second adjustment drive,
  - wherein the controller is configured to control the first adjustment drive, before performing a bending operation or a series of bending operations, to bring the first mount into a working position;
  - wherein in the working position, a tool tip of a bending tool held by the first tool mount lies within the light field formed by the light barrier;
  - wherein the controller is configured to bring the first mount into the working position depending on a shadow of the tool tip being detected by the light receiver;
  - wherein the controller is configured to determine a position of the tool tip within the light field or to determine the position of the light barrier based on the shadow of the tool tip being detected by the light receiver;
  - wherein the controller is configured to adjust the first mount depending on a determined position of the tool tip within the light field or a determined position of the light barrier, until the tool tip comes to lie in a target position or a target region within the light field;
  - wherein when the tool tip is outside a predefined first region comprising a target position or a target region within the light field and inside a predefined second region within the light field, wherein the predefined first region is inside the predefined second region, the controller is configured to adjust a position of the first mount depending on a determined position of the tool tip within the light field or a determined position of the light barrier; and
  - wherein the controller is configured to adjust the position of the first mount until the tool tip comes to lie in the predefined first region.

19. The bending press according to claim 18, wherein the bending press comprises a press brake.

* * * * *

UNITED STATES PATENT AND TRADEMARK OFFICE
CERTIFICATE OF CORRECTION

| | | |
|---|---|---|
| PATENT NO. | : 12,121,953 B2 | Page 1 of 1 |
| APPLICATION NO. | : 17/255058 | |
| DATED | : October 22, 2024 | |
| INVENTOR(S) | : Thomas Denkmeier et al. | |

It is certified that error appears in the above-identified patent and that said Letters Patent is hereby corrected as shown below:

On the Title Page

Item (73): please change: "Gmbh" to correctly read: -- GmbH --

Signed and Sealed this
Tenth Day of December, 2024

Katherine Kelly Vidal
*Director of the United States Patent and Trademark Office*